United States Patent
Baumgartner et al.

(10) Patent No.: US 7,829,752 B2
(45) Date of Patent: *Nov. 9, 2010

(54) PROCESS FOR PRODUCING LOWER OLEFINS

(75) Inventors: Arthur James Baumgartner, Houston, TX (US); Danny Yuk-Kwan Ngan, Houston, TX (US)

(73) Assignee: Shell Oil Company, Houston, TX (US)

(*) Notice: Subject to any disclaimer, the term of this patent is extended or adjusted under 35 U.S.C. 154(b) by 709 days.

This patent is subject to a terminal disclaimer.

(21) Appl. No.: 11/689,932

(22) Filed: Mar. 22, 2007

(65) Prior Publication Data

US 2007/0232846 A1    Oct. 4, 2007

Related U.S. Application Data (60) Provisional application No. 60/786,956, filed on Mar. 29, 2006.

(51) Int. Cl.
C07C 4/02 (2006.01)
(52) U.S. Cl. .............. 585/652; 585/648; 585/650; 208/128; 208/129; 208/130; 208/132
(58) Field of Classification Search .......... 585/648, 585/650, 652; 208/128, 129, 130, 132
See application file for complete search history.

(56) References Cited

U.S. PATENT DOCUMENTS

| | | | |
|---|---|---|---|
| 3,617,493 A | 11/1971 | Wirth | 208/80 |
| 3,676,523 A | 7/1972 | Mason | 260/683 |
| 3,928,170 A | 12/1975 | Takahashi et al. | 208/40 |
| 4,062,758 A | 12/1977 | Goudriaan et al. | 208/80 |
| 4,169,782 A | 10/1979 | Thompson | 208/102 |
| 4,257,871 A | 3/1981 | Wernicke et al. | 208/57 |
| 4,264,432 A | 4/1981 | Gartside | 208/48 R |
| 4,389,302 A | 6/1983 | Garwin et al. | 208/86 |
| 4,428,823 A | 1/1984 | Hessler et al. | 208/78 |
| 4,454,023 A | 6/1984 | Lutz | 208/96 |
| 4,615,791 A | 10/1986 | Choi et al. | 208/107 |
| 4,615,795 A | 10/1986 | Woebcke et al. | 208/72 |
| 4,773,986 A | 9/1988 | Feldman et al. | 208/96 |
| 4,792,389 A | 12/1988 | Frohn et al. | 208/76 |
| 5,580,443 A | 12/1996 | Yoshida et al. | 208/130 |
| 5,582,711 A | 12/1996 | Ellis et al. | 208/76 |
| 5,853,567 A | 12/1998 | Gouzien et al. | 208/132 |
| 5,925,236 A | 7/1999 | Fresing et al. | 208/131 |
| 5,980,732 A | 11/1999 | Gillis | 208/210 |
| 6,048,448 A | 4/2000 | Nirell | 208/67 |
| 6,376,732 B1 | 4/2002 | Ngan et al. | 585/800 |
| 6,464,858 B1 | 10/2002 | Brown et al. | 208/48 |
| 6,626,424 B2 | 9/2003 | Ngan et al. | 261/112.1 |
| 6,632,351 B1 | 10/2003 | Ngan et al. | 208/132 |
| 6,787,024 B2 | 9/2004 | Siskin et al. | 208/48 R |

(Continued)

FOREIGN PATENT DOCUMENTS

EP        249052        12/1987

(Continued)

*Primary Examiner*—Prem C Singh (57) ABSTRACT

A process for making lower olefins from a heavy hydrocarbon feed by use of a combination of thermal cracking and vapor-liquid separation, and, then, pyrolytically cracking the light fraction of the thermally-cracked heavy hydrocarbon feed to thereby produce a lower olefin product.

35 Claims, 5 Drawing Sheets

U.S. PATENT DOCUMENTS

| | | | |
|---|---|---|---|
| 2004/0004022 A1 | 1/2004 | Stell et al. | 208/106 |
| 2004/0004028 A1 | 1/2004 | Stell et al. | 208/130 |
| 2004/0054247 A1 | 3/2004 | Powers | 585/652 |
| 2007/0232845 A1* | 10/2007 | Baumgartner et al. | 585/648 |
| 2009/0054716 A1* | 2/2009 | Baumgartner et al. | 585/648 |

FOREIGN PATENT DOCUMENTS

| | | | |
|---|---|---|---|
| EP | 0427854 | | 5/1991 |
| EP | 768363 | | 4/1997 |
| FR | 2768154 | | 3/1999 |
| GB | 1233795 | | 5/1971 |
| WO | WO 96/07716 | * | 3/1996 |
| WO | WO2005113713 | | 12/2005 |
| WO | WO2006/037805 | | 4/2006 |
| WO | WO2007047942 | | 4/2007 |

* cited by examiner

PROCESS FOR PRODUCING LOWER OLEFINS

This application claims the benefit of U.S. Provisional Application No. 60/786,956 filed Mar. 29, 2006.

FIELD OF THE INVENTION

This invention relates to the processing of a heavy hydrocarbon feedstock to produce lower olefins.

BACKGROUND OF THE INVENTION

A common process for manufacturing lower olefins is through pyrolytic cracking of saturated hydrocarbon feedstocks containing hydrocarbons such as ethane, propane, butane, pentane, and crude oil fractions such as naphtha and gas oil. Producers of lower olefins are always looking for lower cost hydrocarbon feedstocks that can be economically upgraded by pyrolytic cracking processes to lower olefins. One material that is of interest for the conversion to a lower olefins product is crude oil and fractions of crude oil that contain pitch, such as petroleum residuum, due to its low cost and the possibility of significantly upgrading its value through its conversion to higher valued products. While petroleum residuum is attractive from a cost standpoint, it does not make a good feedstock for pyrolytic cracking, because it does not completely vaporize in the convection section of traditional pyrolytic cracking furnaces, and the yields of high valued products are poor.

U.S. Pat. No. 4,615,795 discloses a process and system for the production of olefins from heavy hydrocarbon feedstocks such as petroleum residuum. A heavy hydrocarbon feedstock is first pretreated at high pressure and moderate temperatures followed by separation into lighter and heavier fractions. The lighter fraction is subsequently pyrolyzed to produce olefins. However, if one wanted to increase the amount of the lighter fraction by trying to increase the separation temperatures and extract more of the lighter fraction by "deep distillation", a commercially infeasible process would be created. This is due in part because coke would form in the distillation train as a result of the high temperatures required—conventionally, such deep distillation requires a vacuum column distillation to avoid very high temperatures that promote coke formation. It would also be difficult to completely vaporize the deep distillation cuts in the convection section of a typical pyrolytic cracking furnace in an olefins plant. In addition, the heavier feed to the furnace would likely increase the amount of tar in the furnace, and increase the coking of the furnace tubes.

A recent advance in pyrolysis of crude oil and crude oil fractions containing pitch is shown in U.S. Pat. No. 6,632,351. In the '351 process a crude oil feedstock or crude oil fractions containing pitch is fed directly into a pyrolysis furnace. The process comprises feeding the crude oil or crude oil fractions containing pitch to a first stage preheater within a convection zone, where the crude oil or crude oil fractions containing pitch are heated within the first stage preheater to an exit temperature of at least 375° C. to produce a heated gas-liquid mixture. The mixture is withdrawn from the first stage preheater and the gas-liquid mixture fed to a vapor-liquid separator, followed by separating and removing the gas from the liquid in the vapor-liquid separator, and feeding the removed gas to a second preheater provided in the convection zone. The preheated gas is then introduced into a radiant zone within the pyrolysis furnace, and pyrolyzed to olefins and associated by-products. While this is an improvement in the overall process, there are still limitations in achieving higher yields of more valuable products due to coke formation in the convection section and vapor-liquid separator at increased separation temperatures needed to increase gas feed rates to the radiant section of the furnace where pyrolysis takes place. Also, increased coke formation will occur in the radiant section because the gas removed in the vapor-liquid separator will contain higher boiling fractions as the vapor-liquid separator temperature increases—i.e., with increasing vapor-liquid separator temperature more coke precursors are removed from the liquid and fed into the radiant section of the furnace.

What is needed is an improved process that permits the economical processing of a heavy hydrocarbon feedstock to produce lower olefins in higher yield, without causing unacceptable fouling or coking in the convection section, the vapor-liquid separator or the radiant section furnace tubes.

SUMMARY OF THE INVENTION

The present invention relates to a process for pyrolyzing a heavy feedstock in order to provide a more economically attractive feed for the manufacture of olefins. In particular, the present invention is a process for pyrolyzing a hydrocarbon feedstock containing undesirable coke precursors in an olefins pyrolysis furnace comprising:

a) feeding the feedstock to a first stage preheater provided in a convection zone of the furnace, and heating said feedstock within the first stage preheater to produce a heated gas-liquid mixture, b) withdrawing the heated gas-liquid mixture from the first stage preheater to a first vapor-liquid separator, c) separating and removing at least a portion of the gas from the liquid in the first vapor-liquid separator, heating the gas in a vapor phase preheater provided in said convection zone, feeding a portion of the heated gas into a radiant zone of the pyrolysis furnace, and pyrolyzing the gas to produce olefins, and feeding a portion of the heated gas to a second vapor-liquid separator, d) withdrawing the liquid from the first vapor-liquid separator, and feeding the removed liquid to a thermal-cracking zone, and subjecting the removed liquid to mild thermal-cracking conditions to produce a thermally-cracked product having a significantly diminished heavy fraction containing components with normal boiling points above 537° C., e) withdrawing the thermally-cracked product from the thermal-cracking zone to the second vapor-liquid separator, f) vaporizing and removing at least a portion of the thermally-cracked components with normal boiling points below 537° C. from the liquid fraction in the second vapor-liquid separator, and feeding the removed portion into a radiant zone of the pyrolysis furnace, and pyrolyzing the removed portion to produce olefins, and g) removing the remaining liquid fraction from the second vapor-liquid separator.

In another embodiment, the present invention relates to a process for pyrolyzing a hydrocarbon feedstock containing undesirable coke precursors in an olefins pyrolysis furnace comprising:

a) feeding the feedstock to a first stage preheater provided in a convection zone of the furnace, and heating said feedstock within the first stage preheater to produce a heated gas-liquid mixture, b) withdrawing the heated gas-liquid mixture from the convection zone of the furnace, and feeding the removed mixture to a vapor-liquid separator, separating and removing at least a portion of the gas from the heated gas-liquid mixture, and feeding the removed gas into a radiant zone of the pyrolysis furnace, and pyrolyzing the gas to produce olefins, c) feeding the removed liquid from the vapor-liquid separator to a thermal-cracking zone, and subjecting the removed liquid to mild thermal-cracking conditions to produce a thermally-cracked product having a significantly reduced heavy fraction containing components with normal boiling points above 537° C., d) removing the thermally-cracked product from the thermal-cracking zone and feeding it to a stripping zone, e) vaporizing and removing at least a portion of the thermally-cracked components with normal boiling points below 537° C. from the liquid fraction in the stripping zone, and feeding the removed portion into the radiant zone of the pyrolysis furnace, and pyrolyzing the removed portion to produce olefins, and f) removing the remaining liquid thermally-cracked fraction from the stripping zone.

Still further, the present invention relates to a process for pyrolyzing a hydrocarbon feedstock containing undesirable coke precursors in an olefins pyrolysis furnace comprising:

a) feeding the feedstock to a first stage preheater provided in a convection zone of the furnace, and heating said feedstock within the first stage preheater to produce a heated gas-liquid mixture, b) feeding the heated gas-liquid mixture to a thermal-cracking zone, and subjecting the mixture to mild thermal-cracking conditions to produce a thermally-cracked product having a significantly diminished heavy fraction containing components with normal boiling points above 537° C., c) withdrawing the thermally-cracked product from the thermal-cracking zone and injecting steam having a temperature of at least 400° C. into it to vaporize at least a portion of the thermally-cracked components with normal boiling points below 537° C. and produce a heated vapor-liquid mixture, d) feeding the heated vapor-liquid mixture into a vapor-liquid separator, e) removing at least a portion of the vapor containing thermally-cracked components with normal boiling points below 537° C. from the vapor-liquid mixture in the vapor-liquid separator, and feeding the removed vapor portion into a radiant zone of the pyrolysis furnace, and pyrolyzing the removed portion to produce olefins, and f) removing the remaining liquid fraction from the vapor-liquid separator.

In yet another embodiment, the present invention is a process for pyrolyzing a hydrocarbon feedstock containing undesirable coke precursors in an olefins pyrolysis furnace comprising:

a) feeding the feedstock to a first stage preheater provided in a convection zone of the furnace, and heating said feedstock within the first stage preheater to produce a heated gas-liquid mixture, b) withdrawing the heated gas-liquid mixture from the first stage preheater to a first vapor-liquid separator, c) separating and removing the gas from the gas-liquid mixture in the first vapor-liquid separator, heating the gas in a vapor phase preheater provided in said convection zone, and feeding at least a portion of the heated gas into a radiant zone of the pyrolysis furnace, and pyrolyzing the gas to produce olefins, d) withdrawing the liquid from the first vapor-liquid separator, and feeding the removed liquid to a thermal-cracking zone, and subjecting the removed liquid to mild thermal-cracking conditions to produce a thermally-cracked product having a significantly diminished heavy fraction containing components with normal boiling points above 537° C., e) withdrawing the thermally-cracked product from the thermal-cracking zone to the second vapor-liquid separator, f) injecting steam having a temperature of at least about 400° C. into the second vapor-liquid separator, g) vaporizing and removing at least a portion of the thermally-cracked components with normal boiling points below 537° C. from the liquid fraction in the second vapor-liquid separator, and feeding the removed portion into a radiant zone of the pyrolysis furnace, and pyrolyzing the removed portion to produce olefins, and h) removing the remaining liquid fraction from the second vapor-liquid separator.

As shown in the drawings and examples which follow, when employing the present invention it is possible to increase the hydrogen content of the recovered hydrocarbon components that are pyrolyzed in the furnace, thus increasing the amount of olefins that can be produced from a heavy feedstock while minimizing the amount of coke precursors in the pyrolysis furnace tubes. For example, with regard to feedstocks containing or even primarily comprised of the heaviest fraction of crude oil (a fraction sometimes called vacuum tower bottoms, also commonly known as short residue, short crude oil residuum or the pitch fraction of crude oil), the increase in hydrogen content of the portion of the feedstock that is pyrolyzed to produce olefins is accomplished by use of the mild thermal cracking conditions in the thermal-cracking zone to remove the highly paraffinic alkyl side chains trapped in the otherwise "non-vaporizable" portion of the heavy feed, i.e. portion of the feedstock not vaporized in a conventional vacuum distillation tower. This "freed product", containing a higher hydrogen content, is then used as pyrolytic furnace feedstock. The cracked residue, containing a reduced hydrogen content and having a reduced viscosity can then be readily blended into, e.g. #6 fuel oil. The result of using the combination of the vapor-liquid separators and a thermal-cracking zone is to upgrade lower valued heavy crude oil fractions into higher value pyrolysis feedstock, without an unacceptable increase in the overall fouling or coking of the attendant furnace convection section or radiant section or in the vapor-liquid separator(s) or in the devices that provide the thermal cracking zone. In addition, the process of the present invention is much cheaper and more energy efficient than building an additional thermal cracking and distillation unit such as described in U.S. Pat. No. 4,615,795 in order to recover the valuable hydrocarbons in the heavy hydrocarbon feedstocks.

DETAILED DESCRIPTION OF THE INVENTION

The heavy hydrocarbon feed (i.e. "hydrocarbon feedstock containing undesirable coke precursors") may comprise a range of heavy hydrocarbons. Examples of suitable feedstocks include, but are not limited to, one or more of long and short residues, heavy hydrocarbon streams from refinery processes, vacuum gas oils, heavy gas oil, and crude oil. Other examples include, but are not limited to, deasphalted oil, SMDS (Shell Middle Distillate Synthesis) heavy ends, GTL (Gas to Liquid) heavy ends, and hydrocrackate.

The invention is described below while referring to FIG. 1 as an illustration of the invention. It is to be understood that the scope of the invention may include any number and types of process steps between each described process step or between a described source and destination within a process step. The olefins pyrolysis furnace 10 is fed with a crude oil or crude oil fractions containing pitch 11 entering into the first stage preheater 12 of a convection zone A.

The first stage preheater 12 in the convection section is typically a bank of tubes, wherein the contents in the tubes are heated primarily by convective heat transfer from the combustion gas exiting from the radiant section of the pyrolysis furnace. In one embodiment, as the crude oil and/or long residue feedstock travels through the first stage preheater 12, it is heated to a temperature which promotes evaporation of the feedstock while leaving coke precursors in a liquid state. We have found that with a crude oil and/or long residue feedstock, it is desirable to fully evaporate the crude oil and/or long residue fractions which do not promote coking in the first stage preheater. As used herein, coking is meant to represent fouling by deposition of all forms of carbonaceous solids, including tars, coke and carbon. Maintaining a wet surface on the walls of the heating tubes substantially diminishes the coking phenomenon in the first stage preheater tubes. So long as the heating surfaces are wetted at a sufficient liquid linear velocity, the coking of those surfaces is inhibited.

Further inhibition of coking is obtained by limiting the temperature of the heating surfaces and all other surfaces that the liquid fractions that promote coking come into contact with. The optimal temperature at which the crude oil and/or long residue feedstock is heated in the first stage preheater of the convection zone so as to avoid temperatures of the heating surfaces that would result in accelerated coke deposition on them, will depend upon the particular crude oil and/or long residue feedstock composition, the pressure of the feedstock in the first stage preheater, and the performance and operation of the vapor-liquid separator(s). In one embodiment of the invention, the crude oil and/or long residue feedstock is heated in the first stage preheater to an exit temperature of at least 300° C., and more preferably to an exit temperature of at least 375° C. In another embodiment, the exit temperature of the feedstock from the first stage preheater is in the range of about 375° C. to about 525° C. Recognizing that the temperature of the crude oil and/or long residue feedstock inside the tubes of the first stage preheater changes over a continuum, generally rising, as the crude oil and/or long residue flows through the tubes up to the temperature at which it exits the first stage preheater, it is desirable to measure the temperature at the exit port of the first stage preheater from the convection zone. Tubing diameter, pressure and temperature are adjusted so that an annular flow regime is produced during the vaporization, thus keeping the wall of the tubing wetted.

The pressure within the first stage preheater 12 is not particularly limited. The pressure within the first stage preheater is generally within a range of 50 psig-400 psig, more preferably from about 60-180 psig.

To further inhibit the production and deposition of coke, especially in the radiant section of the furnace and to assist in the vaporization of liquid feedstocks in the convection section of the furnace, a dilution gas is fed to the furnace, most commonly to one or more portions of the feedstock heating and vaporization zones incorporated into the convection section of a pyrolysis furnace. In the embodiments described herein, the feed of dilution gas is a stream which is a vapor at the injection point into the first stage preheater. Any gas can be used which promotes the evaporation of the crude oil and/or long residue feedstock. The dilution gas feed injected externally also assists in establishing and maintaining the flow regime of the feedstock through the tubes whereby the tubes remain wetted and avoid a stratified flow. Examples of dilution gases are dilution steam, methane, nitrogen, hydrogen and natural gas. To further assist in feedstock evaporation the dilution gas can be supplemented with a typical light pyrolytic furnace feedstock such as ethane, propane, refinery off gas, and vaporized gasoline or naphtha. Preferably, the dilution gas is dilution steam.

In an optional but preferred embodiment of the invention, a feed of dilution steam 13 may be added to the crude oil and/or long residue feedstock in the first stage preheater at any point prior to the exit of the gas-liquid mixture from the first stage preheater, but preferably at the position in the preheater tubing just prior to where initial vaporization begins for the purpose of insuring an annular flow regime is quickly obtained in the preheater. In a more preferred embodiment, dilution steam is also added to the crude oil and/or long residue feedstock of the first stage preheater at a point external to pyrolysis furnace immediately downstream of the first stage preheater. Further, while a nozzle is not required, it is preferred that a mixing nozzle 42 be used to mix the steam and the feedstock. It is also preferred to add a further amount of superheated dilution steam 13A to the vapor outlet of the first stage vapor-liquid separator 20 in order to ensure that the vapor flowing to the furnace heating coil is always above its dew point and no condensation of tars occurs on the walls of the piping connecting the vapor outlet of the separator and the furnace heating bank located downstream of it.

The temperature of the dilution gas is at a minimum sufficient to maintain the stream in a gaseous state. With respect to dilution steam, it is preferably added at a temperature above the temperature of the crude oil and/or long residue feedstock measured at the injection point to ensure that the dilution gas does not condense, more preferably at least 25° C. above the crude oil and/or long residue feedstock temperature at the injection point. The pressure of dilution gas is not particularly limited, but is preferably sufficient to allow injection over a wide range of feedstock flow rates. Typical dilution gas pressures added to the crude oil and/or long residue feedstock are within the range of 70-400 psig.

It is desirable to add dilution steam into the first stage preheater and/or downstream of it in an amount up to about 0.5:1 lbs. of steam per lb. of hydrocarbon vapor being fed to the radiant section, although higher ratios can be used. Preferably the amount of steam should not be less than 0.3:1 lbs. of steam per lb. of hydrocarbon.

The percentage of vaporized components in a gas-liquid mixture within the first preheater may be adjusted by controlling the feedstock inlet temperature, the quantity of optional dilution steam added, and the temperature of optional superheated dilution steam added to the crude oil and/or long residue feedstock in the first stage preheater 12 and downstream of it.

Figure 3:
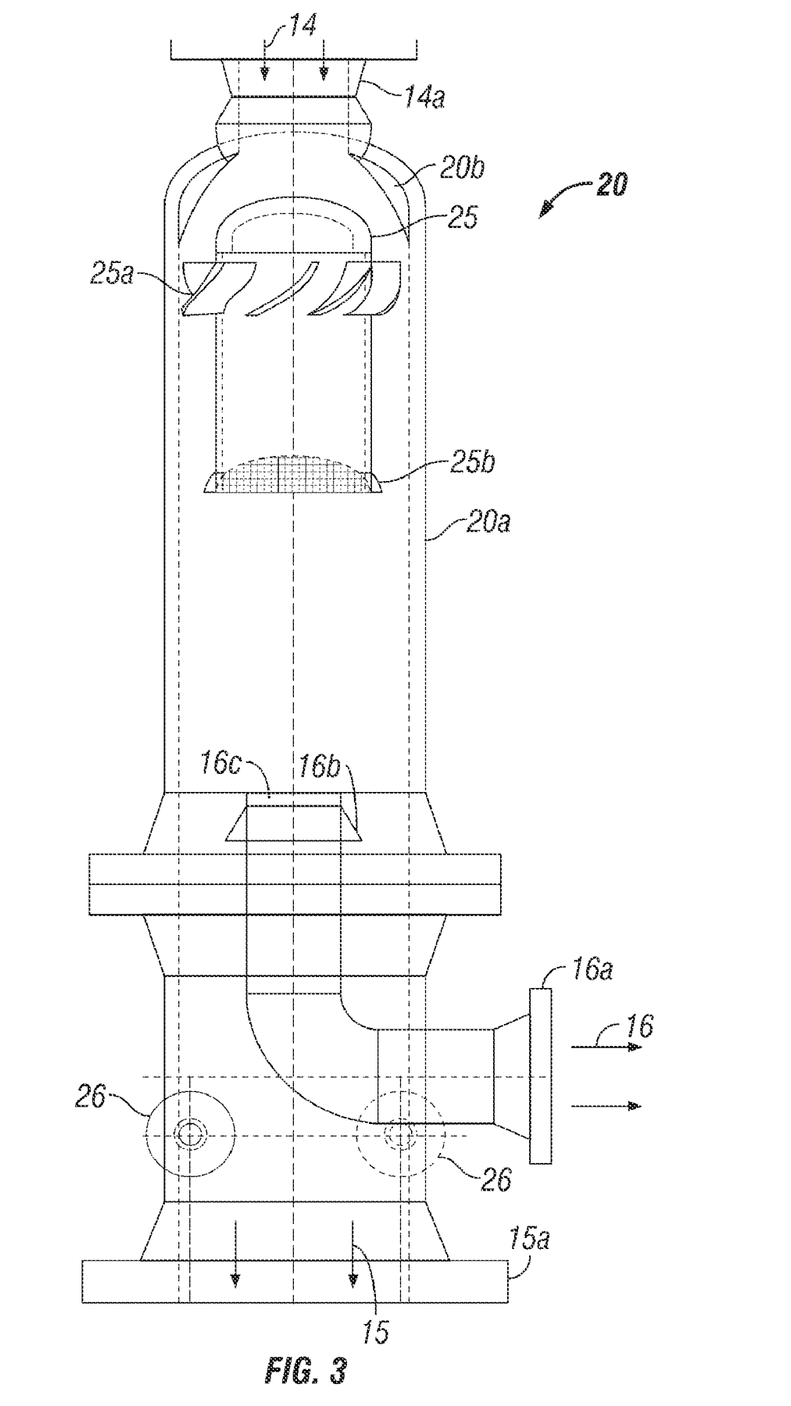
FIG. 3 is an elevation view of a vapor-liquid separator used in the invention.

Once the crude oil and/or long residue feedstock has been heated to produce a gas-liquid mixture, it is withdrawn from the first stage preheater through line 14 to a vapor-liquid separator 20 as a heated gas-liquid mixture. The vapor-liquid separator removes the non-vaporized portion of the crude oil and/or long residue feed, which is withdrawn and separated from the vaporized gases of the crude oil and/or long residue feed. The vapor-liquid separator can be any separator, including a cyclone separator, a centrifuge, or a fractionation device commonly used in heavy oil processing. The vapor-liquid separator can be configured to accept side entry feed wherein the vapor exits the top of the separator and the liquids exit the bottom of the separator, or a top entry feed wherein the product gases exit the side of the separator such as shown in FIG. 3.

The vapor-liquid separator operating temperature is sufficient to maintain the temperature of the gas-liquid mixture within the range of 375° C. to 525° C., preferably within the range of 400° C. to 500° C. The vapor-liquid temperature can be adjusted by any means, including increasing the temperature of the feedstock from the furnace, by use of external heat exchangers and/or by increasing the temperature or flow of the dilution steam routed to it. In a preferred embodiment, the vapor-liquid separator is described in U.S. Pat. Nos. 6,376,732 and 6,632,351, which disclosures are hereby incorporated by reference.

In the preferred embodiment, the vaporized gases from the first vapor-liquid separator 20 are then fed to a vapor preheater 32 in the convection zone of the pyrolysis furnace in order to increase the temperature of the stream from a typical temperature of about 427° C. to a maximum temperature not to exceed 677° C. A portion of the stream 34, shown as stream 17 in FIG. 1 may be routed, for temperature control of the second vapor-liquid separator, to the second stage preheater 21 to be pyrolyzed to olefins. The major portion of the stream is routed via line 34 to the second vapor-liquid separator 35 in order to assist in the vaporization of thermally-cracked components with normal boiling points below 537° C. generated in the thermal-cracking zone 36. The major portion of the vapor is mixed with the liquid 37 from the thermal cracking zone 36 in a mixing nozzle 40. Any mixing nozzle can be used, but preferably the mixing nozzle described in U.S. Pat. No. 6,626,424 should be used.

The liquid stream 15 separated by the vapor-liquid separator 20 is fed to a thermal-cracking zone 36. The thermal-cracking zone comprises a vessel where the product may be subject to a "soaking" period. Any device or vessel may be used to achieve the soaking period. For example, referring to FIG. 4 the soaking vessel can be a vertical drum 60 that is connected directly to the bottom 61 of a top entry axial cyclone, where the liquid separated from the vapor by the cyclone flows directly downward entering the top of the drum. The liquid temperature and residence time in the drum are adjusted to thermally crack the liquid. Accordingly, the extent of thermal cracking may be controlled by either controlling the temperature of liquid in the drum and/or by controlling its residence time. The temperature of the thermal cracking zone in the drum is controlled by adjusting the operating temperature of the cyclone 61 above it and the residence time in the thermal cracking zone is controlled by adjusting the liquid level 64 in the drum. The cyclone temperature may be controlled by a variety of means such as by regulating the relative amounts of superheated dilution steam that are routed into the first cyclone and the second cyclone. Also, water may be injected into the superheated dilution steam that is routed to the first cyclone for control of the first cyclone temperature and accordingly control of the inlet temperature to the thermal cracking zone.

Figure 4:
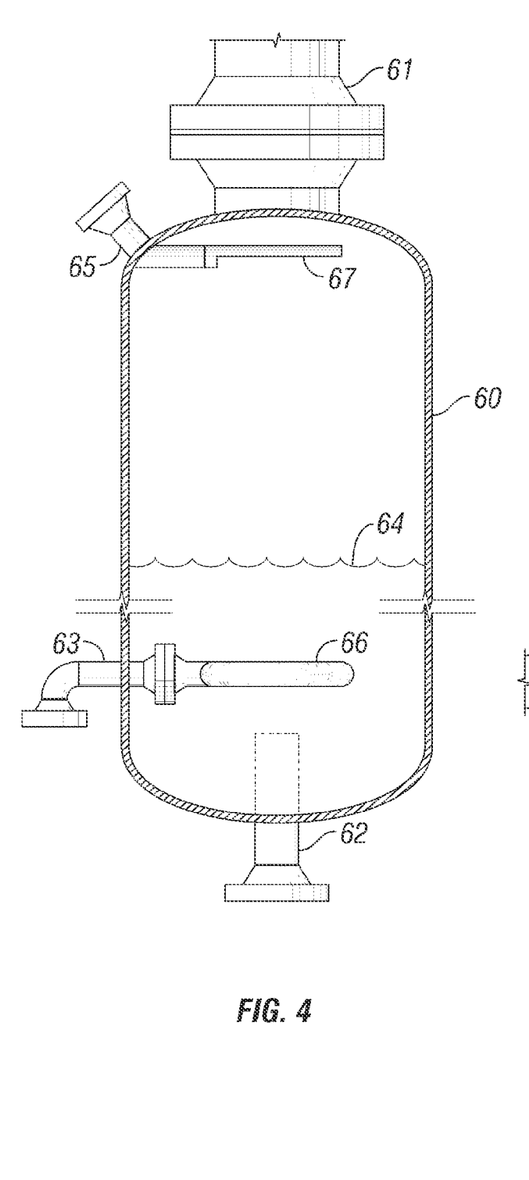
FIG. 4 is a schematic view of one type of thermal-cracking zone used in the invention.

Stagnant conditions in the thermal cracking zone that might result in localized areas of thermal cracking the liquid to the extent of causing it to become locally unstable are avoided by action of the rapidly rotating vapor phase above the liquid level in the drum causing the liquid in the drum to slowly rotate. It should be noted that the vapor phase areas of the drum and the cyclone above it are not isolated from one another. The connection of them causes the vapor in the top portion of the drum above the liquid level to rapidly rotate. Rotation of the liquid in the drum results in sufficient radial mixing action to maintain a uniform cross-sectional liquid residence time as the pitch from the cyclone travels downward through the drum. While a modest amount of mixing action in a radial or horizontal direction is desirable, vertical or axial backmixing is undesirable, as it will result in non-uniform residence time of pitch in the thermal cracking zone as it travels downward in the drum and therefore is to be avoided. In this drum design, vertical back mixing is minimized by proper selection of the drum diameter such that the ratio of the length, L of the thermal cracking zone to the internal diameter of the drum, D is large. L/D ratios of at least 3 can be used although a L/D ratio of 6 or higher is preferred.

Figure 1:
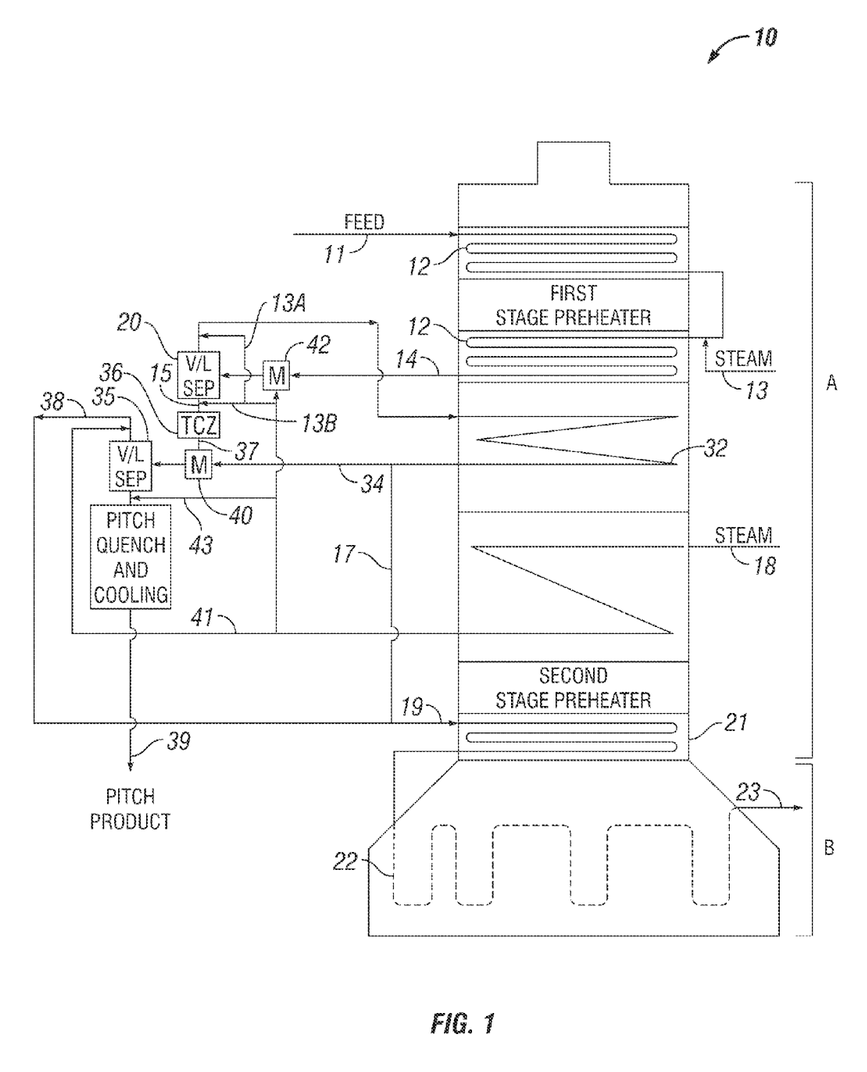
FIG. 1 is a schematic diagram representing the process flow of the preferred embodiment of the inventive process that utilizes two vapor-liquid separators and a single cracking furnace for heating the heavy hydrocarbon feed to mild thermal-cracking conditions and for pyrolyzing the light fraction of the thermally-cracked heavy hydrocarbon product, together with the light fraction of the un-cracked feedstock vaporized in the first vapor-liquid separator.

To prevent hot vapors in the cyclone from leaving the bottom of the cyclone along with the liquid, a small amount of superheated steam is injected via line 13B in FIG. 1 (line 65 in FIG. 4) into the vapor phase above the liquid level in the drum which flows upward in countercurrent flow to the liquid flowing down from the cyclone. This flow of steam is adjusted so that is does not entrain with it any liquid leaving the bottom of the cyclone causing liquid to flow upward and reenter the cyclone.

Referring again to FIG. 1, the thermally-cracked product is fed to the second vapor-liquid separator unit 35 by way of conduit 37. The second vapor-liquid separator may be similar to the first vapor-liquid separator, i.e. it may also be a cyclonic separator. As the intention of the second vapor-liquid separator is to remove thermally cracked components with normal boiling points less than 537° C. from the liquid leaving the thermal-cracking zone, it is desirable to reduce the temperature of the liquid leaving the second vapor-liquid separator rapidly so that only a very limited amount of additional thermal cracking is done outside of the thermal-cracking zone where thermal cracking is purposely controlled. Accordingly, a quench stream is used to rapidly reduce and control the temperature of the liquid leaving the second vapor-liquid separator. Although any type of vessel may be used to receive the quenched liquid from the second vapor-liquid separator, it is preferred to use a vertical drum located underneath the second vapor-liquid separator for that purpose and to control the temperature in this drum at about 320° C. which is generally accepted to be a temperature where no significant amount of thermal cracking will take place. A quench stream (not shown) is produced by withdrawing a portion of the liquid contained in the drum underneath the second cyclone, cooling it and recycling it to the drum. Rapid quenching is achieved by introducing the cooled recycled liquid into the top of the drum above the liquid level via a spray ring. Hot vapor from the cyclone above is prevented from entering the drum and condensing on the 320° C. liquid by injection of a small flow of superheated dilution steam 43 into the top portion of the drum above the spray ring to form a vapor barrier between the drum and the cyclone. While any distributor can used for injection of this superheated steam into the top portion of the drum, it is preferred to use the distributor shown in FIG. 4a.

Referring to FIG. 1 again, the liquid product 39 from the second vapor-liquid separator will typically be used as fuel oil or coker feed or be sent to a gasifier for gasification.

While the intention of this equipment design is to do nearly all of the thermal cracking of the feedstock in the thermal cracking zone where temperature and residence time are controlled, a small portion of the intended thermal cracking of the feedstock will inevitably occur outside of the thermal cracking zone. That is because thermal cracking will start when the feedstock first reaches thermal cracking temperatures inside the mixing nozzle at the entrance of the first cyclone and will not stop until the cracked pitch is quenched to a non-reactive temperature by a spray ring in the pitch accumulator drum underneath the second cyclone. However, since the residence time of the liquid is small in equipment that is operated at thermal cracking temperatures outside of the thermal cracking zone, very little thermal cracking is done outside of the thermal cracking zone. As in a conventional soaker, self-cooling of the cracked liquid will occur while it is undergoing thermal cracking because thermal cracking is an endothermic process and therefore requires heat and in unheated vessels and piping such as a soaker and its associated equipment where thermal cracking is taking place, the cracked liquid temperature will be reduced according to the rate of thermal cracking. Typically, the temperature of the heavy cracked liquid as it traverses the thermal cracking zone will be reduced by 15 to 25° C. For example, a temperature of 440° C. may be used in the first vapor-liquid separator and this will produce a heavy liquid of nearly the same temperature that is then fed into the thermal cracking zone. However the outlet of the thermal cracking zone will be about 20° C. lower or 420° C.

The advantage of having a second vapor-liquid separator is to be able to operate the first stage preheater at modest temperature, 375° C. or even lower and avoid any significant coking formation in it. An important added advantage is that the vaporized portion of the feedstock leaving the first vapor-liquid separator is readily recovered in the second vapor-liquid separator and it together with almost the entire amount of dilution steam injected into the furnace convection section are used as a lifting gas to promote the vaporization of thermally cracked components with normal boiling points less than 537° C. from the liquid leaving the thermal cracking zone. The lifting gas promotes vaporization of the components in the liquid phase by reducing the partial pressure of those components in the vapor phase and thereby allows them to vaporize at lower temperatures in much the same way that lowering the pressure of a single component liquid allows it to boil at a lower temperature. In this regard, use of the un-cracked vaporized feedstock components leaving the first vapor-liquid separator as a supplement to dilution steam for lifting gas in the second vapor-liquid separator works very well because the cracked components in the liquid phase leaving the thermal cracking zone are in very low concentrations or non-existent in the lighter portion of the un-cracked feedstock that is vaporized in the first vapor-liquid separator. By maximizing the amount of lifting gas, the required operating temperature of the second vapor-liquid separator is minimized and accordingly the possibility of coke formation in the second vapor-liquid separator is also minimized. Still a further advantage of having two vapor-liquid separators is that it allows the vapor leaving the first vapor-liquid separator to be independently superheated in the convection section to a wide range of temperatures allowing the capability to achieve adequately high temperatures in the second vapor-liquid separator for vaporizing most of thermally cracked components from the liquid leaving the thermal cracking zone.

Since the purpose of the second vapor-liquid separator is to remove vaporized light thermally-cracked products, i.e. products whose normal boiling points are below 537° C. by use of a large amount of lifting gas the temperature of the second vapor-liquid separator can be held at temperature typically much lower than 537° C. but normally a higher temperature than the thermal cracking zone temperature is required in order to facilitate removal of the thermally-cracked products with normal boiling points below 537° C. When the first vapor-liquid separator is operated at 440° C., the outlet of the thermal cracking zone will typically be in the range of 415 to 425° C. and the second vapor-liquid separator could be operated in the range of 460 to 480° C. The range of operation of the second vapor-liquid separator will be higher than the thermal cracking zone, typically between about 460° C. up to 537° C. with lower temperatures being preferred to minimize coke deposition or fouling of the equipment.

The heated steam/gas mixture exits the second vapor-liquid separator via line 38 and is superheated by the addition of a small amount of dilution steam 41, the mixture is then fed to the second stage preheater 21 and is heated in the second stage preheater as it flows through tubes heated by combustion gases from the radiant section of the furnace. In the second stage preheater 21, the mixed superheated steam-gas mixture is fully preheated to near or just below a temperature at which significant feedstock cracking and associated coke deposition in the preheater would occur. The mixed feed subsequently flows to the radiant section B through line 22 of the olefins pyrolysis furnace where the gaseous hydrocarbons are pyrolyzed to olefins and associated by-products exiting the furnace through line 23. Typical inlet temperatures to the radiant section B are above 480° C., more preferably at least 510° C., most preferably at least 537° C., and at least 732° C. at the exit, more preferably at least 760° C., and most preferably between 760° C. and 815° C., to promote cracking of long and short chain molecules to olefins. Products of an olefins pyrolysis furnace include, but are not limited to, ethylene, propylene, butadiene, benzene, hydrogen, and methane, and other associated olefinic, paraffinic, and aromatic products. Ethylene is the predominant product, typically ranging from 15 to 30 wt %, based on the weight of the vaporized feedstock.

The process of the invention inhibits coke formation within the vapor-liquid separators 20 and 35 and in the first stage preheater 21, by continually wetting the heating surfaces within the first stage preheater and surfaces inside the vapor-liquid separators and associated equipment upstream of the second stage preheater. The process of the invention achieves high recovery of crude oil and/or long residue fractions not otherwise obtainable with one vapor-liquid separator by action of higher temperatures in the second vapor-liquid separator and a very large amount of lifting gas in the second vapor-liquid separator, while simultaneously inhibiting coke formation. The process of the invention achieves the conversion by controlled liquid phase cracking of components in a feedstock with normal boiling points higher than 537° C. to cracked components with normal boiling points less than 537° C. and a very high recovery of those cracked components as valuable pyrolysis feedstock in the furnace thereby increasing the amount of olefins that can be produced from a feedstock beyond that which could be achieved by stripping, fractionating or distilling the feedstock.

Pyrolytic cracking furnace 10 defines a pyrolytic cracking zone (the radiant section of the furnace) and provides means for pyrolytically cracking the hydrocarbons of the light fraction of the feedstock and the light fraction created by thermal cracking to thereby yield a product rich in lower molecular weight olefins such as ethylene, propylene and butadiene. The lower olefin-rich product passes from pyrolytic cracking furnace 10 through conduit 23. As stated above, the pyrolytic cracking product comprises lower olefins but includes other derivatives.

As these terms are used herein, the light fraction comprises those hydrocarbon compounds that may suitably be used as feedstock for pyrolytic cracking furnaces that are capable of vaporizing and pyrolytically cracking liquid hydrocarbon feedstocks. Such hydrocarbon compounds are generally those hydrocarbons that have normal boiling temperatures, meaning boiling temperatures at 14.696 psia of less than 566° C., more preferably less than 537° C., and are liquids at normal feedstock pressures required at the inlet of the first stage preheater. Feedstocks that have been derived directly by fractionation of crude oil and that predominately contain components with lower normal boiling points are usually more paraffinic in nature and tend to be better hydrocarbon feedstock with higher yields of lower olefins for pyrolytic cracking furnaces than heavier feedstocks derived from crude oil that contain components with higher normal boiling points. Also these feedstocks with lower normal boiling points can be easily processed in traditionally designed pyrolysis furnaces.

The thermally-cracked heavy hydrocarbon product 39 obtained from the second vapor-liquid separator will in general have a viscosity lower than the viscosity of the portion of hydrocarbon feedstock having the same normal boiling point range because the long paraffinic side chains have been removed from that portion of the feedstock. Hence, the mild thermal-cracking conditions may comprise those that are known to one skilled in the art for thermal-cracking residual petroleum fuel oils and residue to reduce the viscosity thereof. The mild thermal-cracking conditions in the thermal cracking zone take place in the liquid phase at relatively low temperatures and are such that the chain-breaking reactions do not to proceed to completion with a large amount of lower olefins created. As such the thermal-cracking conditions are much less severe than those conditions used in pyrolytic cracking of hydrocarbon feedstocks to produce lower olefins. What is desired in the thermal cracking zone is to break off the alkyl side chains from the poly-ringed aromatic compounds present in the fraction of the feed having components with normal boiling points above 537° C.: the 'freed' alkyl side chains are easier to be vaporized and give higher pyrolysis product yields, whereas the remaining polyaromatic ringed compounds have high boiling points and yield much lower value pyrolysis products. It is desired to thermally crack heavy components in the feedstock only to the extent that there is an absence of asphaltene precipitation in the cracked heavy liquid product. Thermal-cracking conditions may include a thermal-cracking temperature, a thermal-cracking time period and even a thermal-cracking pressure although liquid phase thermal cracking is not particularly sensitive to pressure.

In an alternative embodiment, the thermal-cracking conditions can be altered to crack more extensively with much higher conversion of components in the feedstock having normal boiling points above 537° C. to cracked components with normal boiling points below 537° C., with the result that asphaltenes are precipitated in the thermal cracking zone. In that case, the yield of olefins from a feedstock may be increased although a heavy cracked liquid product is produced that cannot be easily stored or blended to fuel oil and typically requires direct use as feedstock to a nearby gasifier or a coker.

Normally operation of the thermal cracking zone should be such as to obtain a stable liquid pitch or residual oil, meaning one where asphaltene precipitation has not occurred and cannot be caused to occur by normal changes in conditions that might be encountered in fuel oil transportation and storage facilities. One means of measuring stability is the Sediment by Extraction test, ASTM—D-473. A number of less than 0.1 wt % means that the residual oil or pitch is stable. Another measure of the stability of the pitch is the Shell Hot Filtration number. The method for determining the Shell Hot Filtration number is disclosed in U.S. Pat. No. 4,773,986, col. 7, line 8 to col. 8, line 38, which disclosure is hereby incorporated by reference. A Shell Hot Filtration number of less than 0.25 means that the residual oil or pitch is stable.

Typical mild thermal-cracking conditions include a temperature of from about 425° C. to about 525° C., a pressure in the range of from about 40 psia to about 320 psia, and wherein the liquid in the thermal-cracking zone is maintained at the thermal-cracking conditions within the thermal-cracking zone for a time period of from about 10 seconds to about 960 seconds. Preferred conditions include a thermal cracking zone inlet temperature of about 440 to about 485° C., and a time period of from about 60 to about 480 seconds with lower temperatures and higher residence times being preferred so as to minimize the possibility of excessive localized cracking from non-uniform temperatures in the thermal cracking zone. Thermal cracking zone residence time and inlet temperature both control the rate of thermal cracking reactions and can be use interchangeably to obtain the same extent of thermal cracking of a feedstock. As an example, as shown below in the Table higher temperatures require the shorter residence times to achieve the same desired extent of cracking.

| Typical Temperature vs. Residence Time for the Same Extent of Thermal Cracking of Residuum in a Soaker Vessel | |
| --- | --- |
| Soaker Inlet Temperature, ° C. | Residence Time, Minutes |
| 425 | 16 |
| 440 | 8 |
| 455 | 4 |
| 470 | 2 |
| 485 | 1 |

By use of the present invention it is possible to convert between 10 and 40 weight percent of the 537° C. plus fraction of the feed to the thermal cracking zone to 537° C. minus vapor product recovered from the second separator, thus resulting in significant increase in the valuable olefin products produced by pyrolysis in the radiant section of the furnace. The quality of feedstock to the radiant section of the furnace (i.e. hydrogen content) is also better than the same amount of feedstock to the radiant section of the furnace that could be obtained by conventional deep distillation of the feedstock.

The pyrolysis furnace may be any type of conventional olefins pyrolysis furnace operated for production of lower molecular weight olefins, especially including a tubular steam-cracking furnace. The tubes within the convection zone of the pyrolysis furnace may be arranged as a bank of tubes in parallel, or the tubes may be arranged for a single pass of the feedstock through the convection zone. At the inlet, the feedstock may be split among several feed passes, each comprised of many straight tubes interconnected with U-bends, or may be fed to a single feed pass comprised of many straight tubes interconnected with U-bends through which all the feedstock flows from the inlet to the outlet of the first stage preheater. Preferably, the first stage preheater is comprised of one or more single pass banks of tubes disposed in the convection zone of the pyrolysis furnace. The second stage preheater may also be a single pass or multiple pass bank of tubes but preferably is a multiple pass bank so that its pressure drop is reduced and the residence time of hydrocarbons passing through it is minimized. In this preferred embodiment, the convection zone for heating and vaporizing of the feedstock comprises a single passage having one or more banks through which all of the crude oil and/or long residue feedstock flows and a multiple pass bank for superheating of the portion of the feedstock that is to be pyrolyzed in the radiant section. Within each bank, the tubes may arranged in a coil or serpentine type arrangement within one row, and each bank may have several rows of tubes.

To further minimize coking in the tubes of the first stage preheater and in tubing further downstream such as the piping leading to the vapor-liquid separator(s), the linear velocity of the crude oil and/or long residue feedstock flow should be selected to reduce the residence time of the liquid at high temperature as higher residence time promotes coke formation on the heated surfaces of the walls. An appropriate linear velocity will also promote formation of a thin liquid layer uniformly wetting the tube surface and provide sufficient shear force at the wall of the tubing to prevent or minimize the deposition of coke. While higher linear velocities of crude oil and/or long residue feedstock through the tubes of the first stage preheater reduce the rate of coke formation and deposition, there is an optimum range of linear velocity for a particular feedstock beyond which the beneficial rates of coke reduction begin to diminish in view of the extra energy requirements needed to pump the feedstock and the sizing requirements of the tubes to accommodate a higher than optimum velocity range.

One means for feeding a crude oil and/or long residue feedstock to the first stage preheater is through the use of any conventional pumping mechanism. In a preferred embodiment of the invention, the linear velocity of the crude oil and/or long residue feedstock is enhanced by injecting a small amount of liquid water into the feedstock downstream of the feed pump and prior to entry within the first stage preheater, or at any point desired within the first stage preheater. As the liquid water vaporizes in the crude oil and/or long residue feedstock, the velocity of the feed through the tubes increases. To achieve this effect, only small quantities of water are needed, such as 1 mole % water or less based on the moles of the feedstock through the first stage preheater tubes.

In many commercial olefins pyrolysis furnaces, the radiant section tubes accumulate sufficient coke every 3-5 weeks to justify a decoking operation of those tubes. The process of the invention provides for the preheating and cracking of a crude oil and/or long residue feedstock in a pyrolytic furnace without having to shut down the furnace for decoking operations of the convection section equipment any more often than the furnace would otherwise have to be shut down in order to conduct the decoking treatment in the radiant section tubes. By the process of the invention, the convection section run period is at least as long as the radiant section run period.

In another embodiment of the invention, the convection section tubes are decoked on a regular scheduled basis at a frequency as required, and in no event more frequent than the frequency of the radiant section decoking. Preferably, the convection section is decoked at a frequency at least 5 times longer, more preferably from at least 6 to 9 times longer than the radiant section decoking schedule. Decoking of tubing in the convection section and radiant section of the furnace may be conducted at the same time by including valves and piping to allow the outlet of the first stage preheater to be directed into the second stage preheater and by putting a flow of steam and air into the first stage preheater. From the second stage preheater the heated steam-air mixture will flow to the radiant section of the furnace and decoke it along with the first and second stage preheaters.

In the embodiments described herein, there is a flow of dilution steam that enters the convection section in a separate heating bank, preferably between the first and second stage preheaters, thereby superheating the flow of dilution steam to a temperature within a range of about 450° C.-700° C. Superheating of the dilution steam is preferred to assist in the vaporization of heavy feedstocks where vaporization temperatures in the first stage preheater are limited by maximum tubewall temperature required to minimize or prevent coke deposition in the first stage preheater.

In yet another embodiment of the invention, a flow of superheated dilution steam is added to the first stage preheater tubes and/or between the exit point from the first stage preheater of the convection section and the downstream vapor-liquid separator via a mixing nozzle 42 or device used to promote uniform liquid wetting of the tubing walls at the mixing point.

Figure 2:
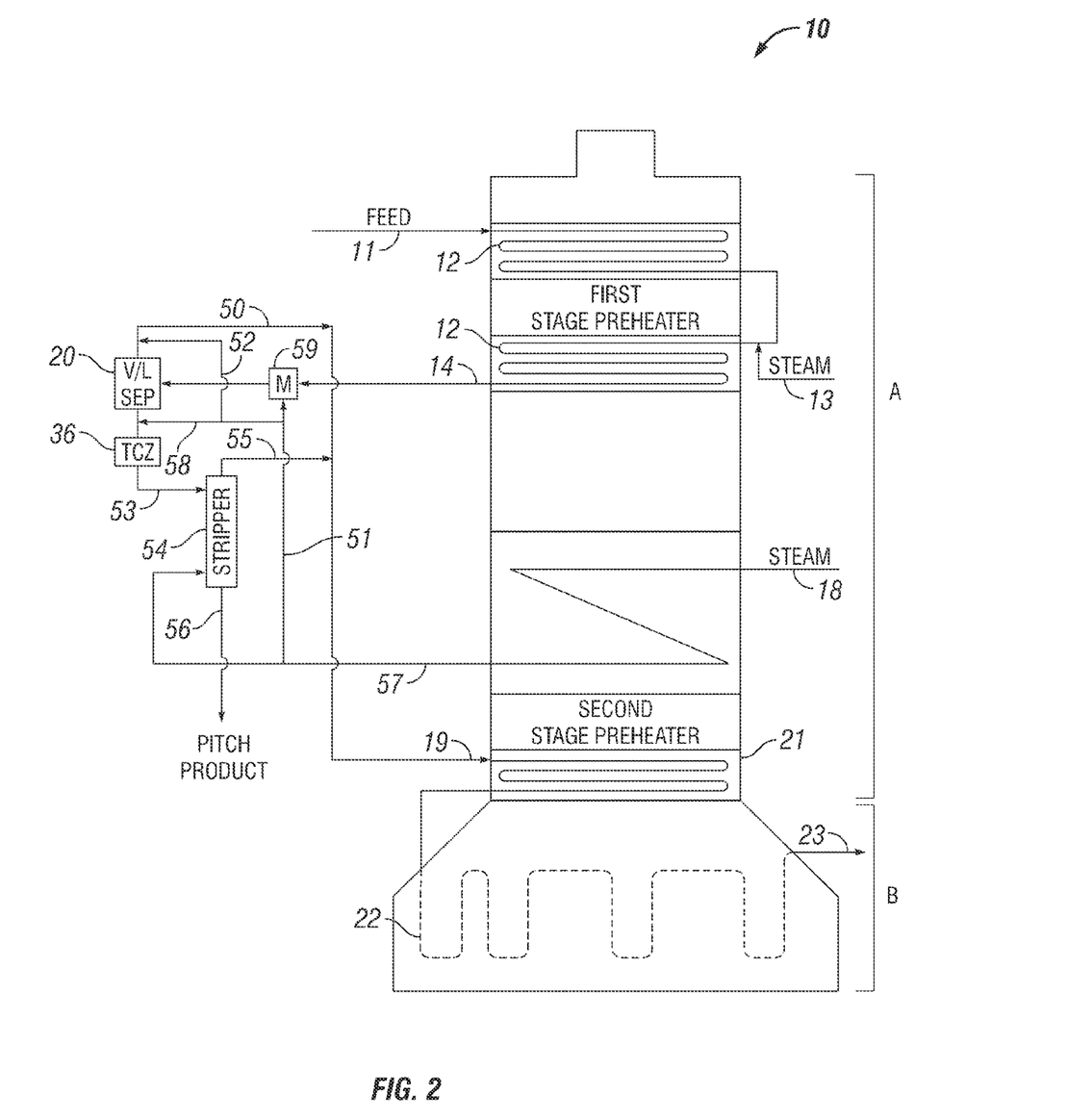
FIG. 2 is a schematic diagram representing another embodiment of the inventive process that utilizes a single vapor-liquid separator and a single cracking furnace for heating the heavy hydrocarbon feed to thermal-cracking conditions and for cracking the light fraction of the thermally-cracked heavy hydrocarbon product together with the light fraction of the un-cracked components feedstock vaporized in the vapor-liquid separator.

Referring to FIG. 2 of the Drawings, in an alternative embodiment of the invention, the product 14 from the first stage preheater 12 is routed to a mixing nozzle 59 where superheated dilution steam is added via line 51 to produce sufficiently high temperatures in the downstream vapor-liquid separator 20, and in the thermal cracking zone for the liquid leaving the vapor-liquid separator so that residence times are in the preferred range stated in Table above can be used for thermal cracking of the liquid. A vapor product stream 50 is removed from the vapor-liquid separator mixed with a small flow of superheated dilution steam 52 injected at the vapor outlet of the vapor-liquid separator to raise the temperature of the vapor well above its dewpoint and produce sufficient superheating of the vapor to prevent condensation of tar on the wall of the piping that connects the vapor outlet of the vapor-liquid separator to the second stage preheater. The liquid stream from the vapor-liquid separator is routed to the thermal-cracking zone 36, where the liquid is subjected to mild thermal-cracking conditions. The resulting thermal-cracked product is then routed via conduit 53 to a stripping section 54, where a portion of the thermally cracked components with norm al boiling points below 537° C. are removed. In this embodiment the vapor-liquid separator can be a top entry axial cyclone and with such a cyclone it is preferred to provide a thermal cracking zone for the heavy liquid leaving the cyclone in a vertical drum underneath the cyclone. To prevent hot vapors in the cyclone from leaving the bottom of the cyclone along with the liquid, a small amount of superheated steam is injected via line 58 into the vapor phase above the liquid level in the drum which flows upward in countercurrent flow to the liquid flowing down from the cyclone. Typically, superheated dilution steam is added via conduit 57 to aid in the stripping. The stripped gases are then routed via conduit 55 to the second stage preheater together with the superheated vapor leaving the vapor-liquid separator 20 to be pyrolyzed in the radiant section of the pyrolysis furnace to produce olefins. The liquid portion is removed via conduit 56, and is typically used as fuel oil or in other typical uses for thermally cracked pitch. This embodiment uses only one vapor-liquid separator.

Referring to FIG. 3, the preferred vapor-liquid separator 20 comprises a vessel having walls 20a, an inlet 14a for receiving the incoming gas-liquid mixture 14, a vapor outlet 16a for directing the vapor phase 16 and a liquid outlet 15a for directing the liquid phase 15. Closely spaced from the inlet 14a is a hub 25 having a plurality of vanes 25a spaced around the circumference of the hub 25, preferably close to the end nearest the inlet 14a. The incoming gas-liquid mixture 14 is dispersed by splashing on the proximal end of the hub 25 and, in particular, by the vanes 25a forcing a portion of the liquid phase 15 of the mixture 14 outwardly toward the walls 20a of the vapor-liquid separator 20 thereby keeping the walls 20a completely wetted with liquid and decreasing the rate of, if not preventing, any coking of the interior of the walls 20a. Likewise, the outer surface of the hub 25 is maintained in a completely wetted condition by a liquid layer that flows down the outer surface of hub 25 due to insufficient forces to transport the liquid 15 in contact with the surface of hub 25 to the interior of the walls 20a. A skirt 25b surrounds the distal end of the hub 25 and aids in forcing all liquid transported down the outer surface of the hub 25 to the interior of the walls 20a by depositing said liquid into the swirling vapor. The upper portion of the vapor-liquid separator 20 is filled in at 20b between the inlet 14a and hub 25 to aid wetting of the interior of walls 20a as the gas-liquid mixture 14 enters the vapor-liquid separator 20. As the liquid 15 is transported downward, it keeps the walls 20a and the hub 25 washed and reduces, if not prevents, the formation of coke on their surfaces. The liquid 15 continues to fall and exits the vapor-liquid separator 20 through the liquid outlet 15a. A pair of inlet nozzles 26 is provided below the vapor outlet tube 16a to provide quench oil, typically recycled thermally cracked pitch that has been cooled to a non-reactive temperature for cooling collected liquid 15 and reducing downstream coke formation by ensuring surfaces underneath the nozzles are well irrigated with liquid. When this cyclone design is applied in the preferred process embodiment that incorporates two vapor-liquid separators, the nozzles 26 are used only in the second cyclone. They are not used in the first cyclone of that design since they would recycle thermally cracked pitch through the thermal cracking zone again, over-cracking it and possibly causing it to become unstable. The vapor phase 16 enters the vapor outlet duct at its highest point 16c, exits at outlet 16a. A skirt 16b surrounds the entrance 16c to the vapor duct 16 and aids in deflecting any liquid 15 outwardly toward the separator walls 20a.

The distance of the hub 25 extension below the vanes 25a was picked based on estimation of the liquid drop size that would be captured before the drop had moved more than half way past the hub 25. Significant liquid 15 will be streaming down the hub 25 (based on observations with the air/water model) and the presence of a 'skirt' 25b on the hub 25 will introduce liquid droplets into the vapor phase well below the vanes 25a, and collection will continue below the skirt 25b of hub 25 due to the continued swirl of the vapor 16 as it moves to the outlet tube 16a. The hub skirt 25b was sized to move liquid from the hub 25 as close as possible to the outer wall 20a without reducing the area for vapor 16 flow below that available in the vanes 25a. As a practical matter, about 20% more area for flow has been provided than is present in the vanes 25a. Further details regarding sizing of the separator are disclosed in U.S. Pat. No. 6,632,351, which is hereby incorporated by reference.

Referring to FIG. 4, the thermal cracking zone as used in FIG. 1 and FIG. 2 is preferably a soaking vessel where the liquid from the vapor-liquid separator is subjected to a "soaking" period. Any device or vessel may be used to achieve the soaking period. For example, as shown in FIG. 4, the soaking vessel 60 can be a vertical drum that is connected directly to the bottom of a top entry axial cyclone 61 such as is represented in FIG. 3, where the liquid separated from the vapor by the cyclone flows directly downward entering the top of the drum. The liquid temperature and residence time in the drum are adjusted to thermally crack the liquid. Accordingly, the extent of thermal cracking may be controlled by either controlling the temperature of liquid in the drum and/or by controlling its residence time. The temperature of the thermal cracking zone in the drum is controlled by adjusting the cyclone temperature above it and its residence time is controlled by adjusting the liquid level 64 in the drum. For the preferred embodiment that has 2 vapor-liquid separators, and is shown in FIG. 1, no cooling in the drum is provided for the heavy liquid leaving the bottom of the cyclone. In that embodiment, the thermal cracking zone extends from the liquid level 64 to the bottom outlet 62 of the drum and the heavy cracked liquid leaves the bottom of the drum at over 400° C. in-route to the mixing nozzle located at the entrance of the second vapor-liquid separator.

Figure 4A:
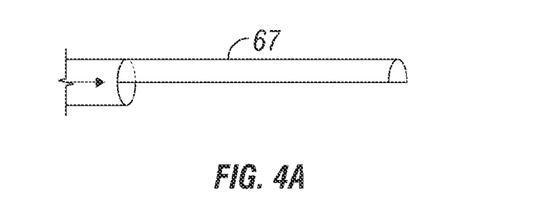
Figure 4B:
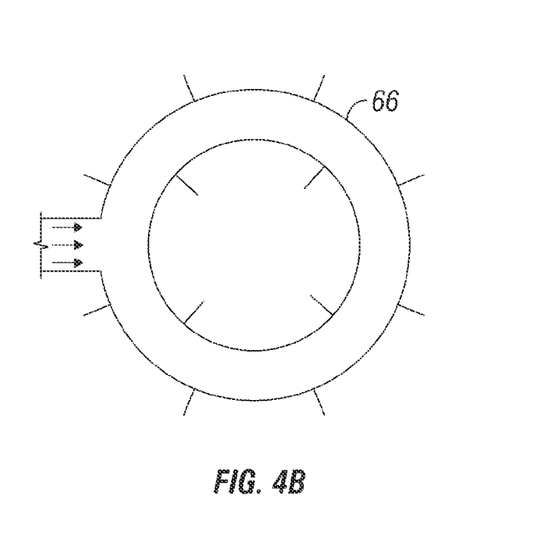

In the embodiment shown in FIG. 2 where a stripper is used, the capability to cool the liquid in the bottom of the drum is provided via a quench ring 66 so that fouling of the trays in the stripper can be avoided or minimized. In that design there are two liquid temperature zones in the drum that are purposely created by recycling cooled thermally cracked pitch from the bottom of the drum, 62 to inlet 63 of the liquid injection quench ring, 66 that is located beneath the liquid level. Cooled liquid is injected into the drum via an injection ring 66, so that there is a more uniform distribution of the cooled liquid to the sides and center of the drum, and improved circulation of the liquid in the bottom of the drum. The ring is shown with 8 holes outward and 4 holes inward, as shown in FIG. 4B.

Below the quench ring a zone of cooled pitch is created by the mixing of hot pitch from the cyclone that is traveling downward in the drum with jets of cooled pitch exiting horizontally oriented holes in the ring. By this action, the rate of thermal cracking of the pitch can be greatly reduced or even stopped if fouling in the pitch sripper is encountered. In general, stripper temperatures will be limited to less than 400° C. to prevent fouling of the trays so some cooling of the liquid leaving the thermal cracking zone is normally required. The thermal cracking zone is located above the quench ring 66 in the drum. As in the preferred embodiment, the inlet temperature of the thermal cracking zone is controlled by adjustment of the temperature of the cyclone above it and the residence time in the thermal cracking zone is controlled by adjustment of the liquid level 64 in the drum.

Stagnant conditions in the drum that might result in localized areas of thermal cracking the liquid to the extent of causing it to become locally unstable are avoided by action of the rapidly rotating vapor phase above liquid level in the drum causing the liquid in the drum to slowly rotate. It should be noted that the vapor phase areas of the drum and the cyclone above it are not isolated from one another. The connection of them causes the vapor in the top portion of the drum above the liquid level to rapidly rotate. To prevent hot vapors from the cyclone from leaving the bottom of the cyclone along with the liquid, a small amount of superheated steam is injected via line 65 into the vapor phase above the liquid level in the drum which flows upward in countercurrent flow to the liquid flowing down from the cyclone. This is especially useful for operation where only a very limited about of thermal cracking is done in the thermal cracking zone with the result that very little if any vapor is generated and disengages from the liquid in the thermal cracking zone. Any device may be used to inject and distribute this superheated steam. As shown in FIG. 4a, we have found such a small amount of superheated steam is needed that that a simple half-pipe distributor 67 with the open side pointed downward works well. This flow of steam is adjusted so that is does not entrain any liquid leaving the bottom of the cyclone causing it to flow upward and reenter the cyclone.

Figure 5:
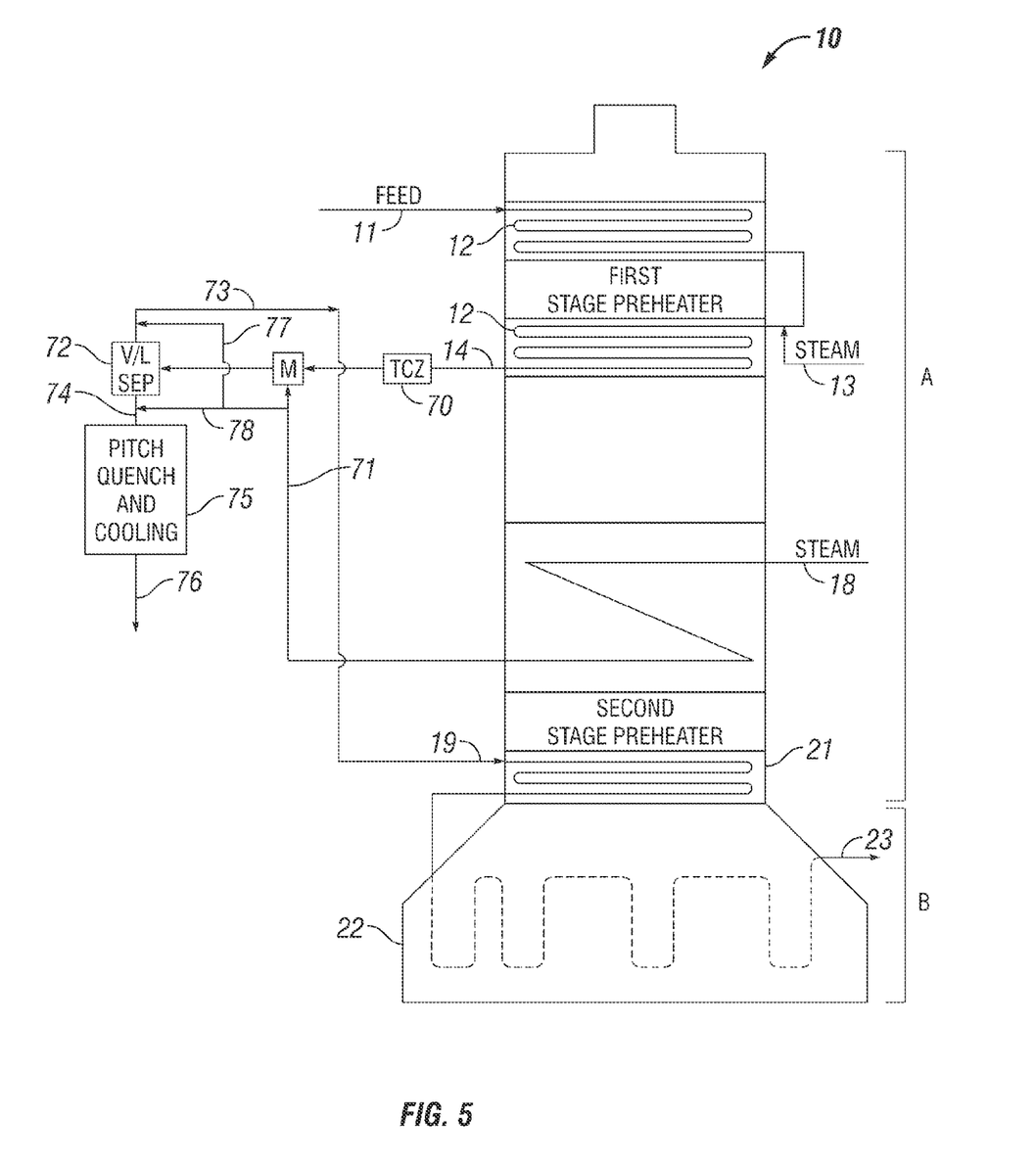
FIG. 5 is a schematic diagram representing another embodiment of the inventive process where the thermal-cracking zone is placed upstream of the vapor-liquid separator.

Referring to FIG. 5, in an alternative embodiment, the thermal-cracking zone may be placed directly after the first preheater, and before the vapor-liquid separator. In this embodiment, the thermal cracking zone can be either a soaking drum or a vessel containing mixing means, such as that disclosed in U.S. Pat. No. 5,853,567, which disclosure is hereby incorporated by reference. A conventional soaker drum would work well if the feedstock is short or long residue where there is relatively little vapor leaving the first stage preheater and entering the soaker drum. However, for a crude oil feedstock there would be too much vapor with the liquid leaving the first stage preheater to use a conventional soaker drum because, among other reasons, the large amount of vapor would require that the size of the soaker drum be very large. For a crude oil feedstock, a thermal cracking zone at the outlet of the first stage preheater could be a very long insulated length of pipe with a diameter sized so that an annular flow regime is maintained while thermal cracking is taking place.

Typically, the heated stream from the first preheater 12 is routed to the thermal cracking vessel 70, which is maintained at a temperature of from about 425° C. to 525° C. Superheated dilution steam is injected at the outlet of the thermal cracking zone via line 71, and the heated vapor-liquid mixture is routed to a vapor-liquid separator 72, where the cracked vapors are recovered via line 73. The liquid is removed via line 74 to an accumulator drum 75, and the pitch is removed via line 76. Although not shown in FIG. 5, the temperature of pitch entering the accumulator drum from the cyclone is rapidly reduced to a non-reactive temperature of about 320° C. by introducing a cooled recycled liquid from the bottom of the drum into the top of the drum above the liquid level via a spray ring. To prevent hot vapors in the cyclone from leaving the bottom of the cyclone along with the liquid, a small amount of superheated steam is injected via line 78 into the vapor phase above spray ring in the accumulator drum which flows upward in countercurrent flow to the liquid flowing down from the cyclone. Superheated steam is injected via line 77 into the cracked vapors to ensure the mixture is well above its dewpoint in interconnecting piping between the vapor-liquid separator and the second stage preheater and the combined stream is routed via line 73 to the pyrolytic furnace where they are heated and converted to produce olefins.

The following examples are intended to illustrate the present invention and are not intended to unduly limit the scope of the invention.

EXAMPLE I

This Example I presents feedstock and product property data for thermal cracking of a vacuum tower bottom feedstock, also commonly called short residue or straight run pitch. The data demonstrates the improvement in the quality of a pyrolytic cracker feedstock, thermal-cracked vacuum tower bottoms as compared to unconverted vacuum tower bottoms. Since short residue or pitch is also the heaviest fraction of long residue and of crude oil, the data presented below also demonstrates that use of the invention described herein with long residue and crude oil feedstocks will also result in a higher quality pyrolytic feedstock being obtained.

By examining certain properties of: (1) the fraction of the thermally cracked product having components with normal boiling temperatures below 537° C.; and (2) the fraction of the feedstock having components with normal boiling points exceeding 537° C. which were converted to cracked components with normal boiling points below 537° C. by the aforementioned thermal-cracking, the improvement in feedstock quality can be easily seen. A vacuum tower bottom (VTB) material was cracked under thermal cracking conditions at a temperature of about 455° C. A simulated distillation in accordance with ASTM D2887 was performed for the VTB and was found to have an ASTM D2887 $T_{10}$ of 460° C., $T_{50}$ of 585° C. and $T_{90}$ of 725° C. The boiling point range of the thermally cracked product was also determined in accordance with ASTM D2887. Accordingly, it should be understood in the data reported below that boiling temperatures refer to ASTM D2887 temperatures which are also called simulated true boiling point temperatures. Approximately 26.8 weight percent of the portion of the VTB having a boiling temperature above 537° C. was converted to hydrocarbons having a boiling temperature below 537° C. The hydrogen content of this 26.8% converted hydrocarbon product was measured using a modified ASTM 5291 test process and found to be 13.15 weight percent.

For comparison, the hydrogen content of the next 26.8 wt % fraction of the VTB boiling above 537° C. was measured using a modified ASTM 5291 test process and found to be 12.39 weight percent. This 26.8 wt % fraction of the VTB that boiled above 537° C. approximated the portion of the VTB boiling above 537° C. that was converted to lower boiling hydrocarbons (i.e., below 537° C.) by thermal cracking described above. Also note the lower hydrogen content in the thermally-cracked liquid (10.82%) as compared to the higher hydrogen content (11.24%) present in the remaining liquid from deep distillation. In the thermal-cracking process, the portion of the VTB having a boiling temperature above 537° C. was converted to hydrocarbons having a boiling temperature below 537° C., and the hydrogen content in this converted fraction was enriched, at the expense of the thermally-cracked liquid product.

As shown in Table I below, the difference in the hydrogen contents between the 26.8 wt % fraction of the unconverted VTB, (12.39 weight percent hydrogen) and the product of the 26.8 wt % portion of the VTB that was converted by thermal cracking, (13.15 weight percent) is an indicator of the improvement in the quality of the VTB as a pyrolytic cracker feed that results from thermal-cracking. The difference in the hydrogen contents was found to be 0.76 weight percent. Generally, a pyrolytic cracker feedstock having a hydrogen content that is higher than an alternative feedstock will be a more desirable pyrolytic cracker feedstock because it normally provides for a higher yield of lower olefins, such as ethylene. Not wishing to be bound by any particular theory, it is believed that the thermal cracking provides benefits by producing higher hydrogen content hydrocarbons that boil at lower temperatures via cracking of the heavier, higher boiling temperature hydrocarbons of the VTB thereby increasing the hydrogen content of the lower boiling fraction of thermally-cracked VTB. In effect this process extracts hydrogen from the heavier, higher boiling hydrocarbons of the VTB and incorporated it in the lower boiling fraction of the thermally-cracked VTB to be used as pyrolytic cracking feedstock.

TABLE I

|  | 537 C- Fraction in Original Feed | Vapor Fraction recovered from 537 C+ of Feed | Total Vaporizable Frac of Feed Used as Pyrolysis Feed | Pitch (Liquid, non-vaporizable Frac of Feed) |
|---|---|---|---|---|
| Thermal Cracking | | | | |
| Wt % of Feed | 22.201 | 26.775 | 48.976 | 51.024 |
| % H | 12.691 | 13.153 | 12.944 | 10.823 |
| % S | 0.23 | 0.356 | 0.299 | 0.307 |
| % N | 0.127 | 0.219 | 0.177 | 0.687 |
| Deep Distillation | | | | |
| Wt % of Feed | 21.976 | 26.775 | 48.750 | 51.250 |
| % H | 12.658 | 12.389 | 12.510 | 11.240 |
| % S | 0.237 | 0.292 | 0.267 | 0.344 |
| % N | 0.124 | 0.249 | 0.193 | 0.654 |

EXAMPLE II

This example shows the predicted pyrolysis yield advantage of thermal-cracked vaporizable product versus pyrolyzing distillates obtained by further very deep vacuum distillation of the VTB feedstock.

Presented below are the results generated by performing a process simulation using a computer pyrolysis model (SPYRO® model), licensed by Technip, to predict pyrolysis yields from the pyrolytic cracking of: (1) the light product from thermal-cracking a vacuum tower bottom material feedstock; and (2) the heavy distillation cut from a vacuum tower bottom feedstock.

Table II presents the predicted pyrolysis yields, using the SPYRO® model, from pyrolyzing the thermally cracked product and from pyrolyzing the heavy distillation vacuum tower bottom cut. The severity used for both simulations, as determined by the molar ratio of hydrogen to carbon in the $C_5+$ portion of the cracker product, was set at 1.031. To achieve this severity with the thermally cracked product as cracker feed, the calculated coil outlet temperature of the cracker was 798° C. and, for the heavy distillation cut as cracker feed, the calculated coil outlet temperature of the cracker was 773° C.

TABLE II

Calculated Yields From the Pyrolytic Cracking of a Thermally-cracked Product and Vacuum Tower Bottom (VTB) Heavy Distillation Cut

| Yields w/Ethane Recycle | Thermally-cracked Product (wt %) | VTB Distillation Cut (wt %) |
|---|---|---|
| Severity (Hydrogen-to-Carbon ratio of ($C_5+$) | 1.031 | 1.031 |
| Propylene to Methane ratio (wt ratio) | 1.166 | 1.606 |
| Coil Outlet Temperature (° F.) | 1470 | 1425 |
| HYDROGEN | 0.517 | 0.245 |
| METHANE | 11.051 | 7.809 |
| ETHYLENE | 20.506 | 17.576 |
| ETHANE | 0.000 | 0.000 |
| PROPYLENE | 12.303 | 12.142 |
| PROPANE | 1.322 | 0.652 |
| BUTADIENE | 4.206 | 3.908 |
| N-BUTYLENES | 2.686 | 3.376 |
| N-BUTANES | 0.359 | 0.110 |
| 1-BUTYLENE | 2.165 | 2.241 |
| ISOPRENE | 0.936 | 1.011 |
| PIP | 0.407 | 0.727 |
| BENZENE | 5.961 | 2.835 |
| C5 GASOLINE | 1.312 | 1.785 |
| RAFFINATE, +C6BOT | 2.144 | 2.804 |
| C7 GASOLINE | 11.892 | 12.101 |
| DCPD | 1.881 | 1.431 |
| HEAVY PYGAS | 0.398 | 0.304 |
| HYT CLGO | 0.474 | 0.491 |
| PITCH | 13.273 | 19.878 |
| CLGO | 6.208 | 8.577 |
| Total | 100 | 100 |

The information in Table II shows that the pyrolytically cracked thermal-cracked product yielded a higher percentage of higher value products than the pyrolytically cracked VTB heavy distillation cut. For instance, the yields of higher value pyrolysis products such as hydrogen, ethylene, propylene, butadiene and benzene from a pyrolytically cracked feedstock that has undergone mild thermal cracking are greater than such yields for the VTB heavy distillation cut. Also, it is noted that significantly less pitch and gas oil are yielded from cracking the thermal-cracked product than from cracking the VTB heavy distillation cut.

While this invention has been described in terms of the presently preferred embodiment, reasonable variation and modifications are possible by those skilled in the art. Such variations and modifications are within the scope of the described invention and appended claims.

That which is claimed is:

1. A process for pyrolyzing a hydrocarbon feedstock containing undesirable coke precursors in an olefins pyrolysis furnace comprising:
   a) feeding the feedstock to a first stage preheater provided in a convection zone of the furnace, and heating said feedstock within the first stage preheater to produce a heated gas-liquid mixture,
   b) withdrawing the heated gas-liquid mixture from the first stage preheater to a first vapor-liquid separator,
   c) separating and removing at least a portion of the gas from the liquid in the first vapor-liquid separator, heating the gas in a vapor phase preheater provided in said convection zone, feeding a first portion of the heated gas into a radiant zone of the pyrolysis furnace and pyrolyzing the gas to produce olefins, and feeding a second portion of the heated gas to a second vapor-liquid separator,
   d) withdrawing the liquid from the first vapor-liquid separator, and feeding the removed liquid to a thermal-cracking zone, and subjecting the removed liquid to mild thermal-cracking conditions to produce a thermally-cracked product having a significantly diminished heavy fraction containing components with normal boiling points above 537° C.,
   e) withdrawing the thermally-cracked product from the thermal-cracking zone to the second vapor-liquid separator, f) vaporizing and removing at least a portion of the thermally-cracked components with normal boiling points below 537° C. from the liquid fraction in the second vapor-liquid separator, feeding the removed gas into a radiant zone of the pyrolysis furnace, and pyrolyzing the gas to produce olefins, and g) removing the remaining liquid fraction from the second vapor-liquid separator.

2. A process for pyrolyzing a hydrocarbon feedstock containing undesirable coke precursors in an olefins pyrolysis furnace comprising:

a) feeding the feedstock to a preheater provided in a convection zone of the furnace, and heating said feedstock within the preheater to produce a heated gas-liquid mixture, b) withdrawing the heated gas-liquid mixture from the convection zone of the furnace, and feeding the removed mixture to a vapor-liquid separator, separating and removing at least a portion of the gas from the heated gas-liquid mixture, and feeding the removed gas into a radiant zone of the pyrolysis furnace, and pyrolyzing the gas to produce olefins, c) feeding the removed liquid from the vapor-liquid separator to a thermal-cracking zone, and subjecting the removed liquid to mild thermal-cracking conditions to produce a thermally-cracked product having a significantly diminished heavy fraction containing components with normal boiling points above 537° C., d) removing the thermally-cracked product from the thermal-cracking zone and feeding it to a stripping zone, e) vaporizing and removing at least a portion of the thermally-cracked components with normal boiling points below 537° C. from the liquid fraction in said stripping zone, and feeding the removed portion into the radiant zone of the pyrolysis furnace, and pyrolyzing the removed portion to olefins, and f) removing the remaining thermally-cracked liquid fraction from the stripping zone.

3. A process for pyrolyzing a hydrocarbon feedstock containing undesirable coke precursors in an olefins pyrolysis furnace comprising:

a) feeding the feedstock to a first stage preheater provided in a convection zone of the furnace, and heating said feedstock within the preheater to produce a heated gas-liquid mixture, b) feeding the heated gas-liquid mixture to a thermal-cracking zone, and subjecting the mixture to mild thermal-cracking conditions to produce a thermally-cracked product having a significantly diminished heavy fraction containing components with normal boiling points above 537° C.

c) withdrawing the thermal-cracked product from the thermal-cracking zone and injecting steam having a temperature of at least 400° C. into it to vaporize at least a portion of the thermally-cracked components with normal boiling points below 537° C. and produce a heated vapor-liquid mixture, d) feeding the heated vapor-liquid mixture into a vapor-liquid separator, e) removing at least a portion of vapor containing thermally-cracked components with normal boiling points below 537° C. from the vapor-liquid mixture in the vapor-liquid separator, and feeding the removed vapor portion into a radiant zone of the pyrolysis furnace, and pyrolyzing the removed portion to produce olefins, and f) removing the remaining liquid fraction from the vapor-liquid separator.

4. A process for pyrolyzing a hydrocarbon feedstock containing undesirable coke precursors in an olefins pyrolysis furnace comprising:

a) feeding the feedstock to a first stage preheater provided in a convection zone of the furnace, and heating said feedstock within the first stage preheater to produce a heated gas-liquid mixture, b) withdrawing the heated gas-liquid mixture from the first stage preheater to a first vapor-liquid separator, c) separating and removing at least a portion of the gas from the gas-liquid mixture in the first vapor-liquid separator, heating the gas in a vapor phase preheater provided in the said convection zone, and feeding the heated gas into a radiant zone of the pyrolysis furnace, and pyrolyzing the gas to produce olefins, d) withdrawing the liquid from the first vapor-liquid separator, and feeding the removed liquid to a thermal-cracking zone, and subjecting the removed liquid to mild thermal-cracking conditions to produce a thermally-cracked product having a significantly diminished heavy fraction containing components with normal boiling points above 537° C., e) withdrawing the thermally-cracked product from the thermal-cracking zone to a second vapor-liquid separator, f) injecting steam having a temperature of at least about 400° C. into the second vapor-liquid separator, g) vaporizing and removing at least a portion of the thermally-cracked components with normal boiling points below 537° C. from the liquid fraction in the second vapor-liquid separator, and feeding the removed portion into a radiant zone of the pyrolysis furnace, and pyrolyzing the removed portion to produce olefins, and h) removing the remaining liquid fraction from the second vapor-liquid separator.

5. The process of claim 1 wherein said mild thermal-cracking conditions include temperatures in the range of about 425° C. to about 525° C., and wherein the liquid in said thermal-cracking zone is maintained at the thermal-cracking conditions within the thermal-cracking zone for a time period of from about 10 seconds to about 960 seconds.

6. The process of claim 5 wherein the thermal-cracking zone is operated such that the remaining liquid fraction from the second vapor-liquid separator is stable with no asphaltene precipitation and has less than 0.1 weight percent sediments as measured by ASTM D-473.

7. The process of claim 6 wherein said thermal-cracking conditions result in the conversion of at least ten (10) weight percent of the components with normal boiling points above 537° C. present in the removed liquid from the first vapor-liquid separator to components with normal boiling points below 537C., said conversion being based on the feed to said thermal-cracking zone.

8. The process of claim 5 wherein said mild thermal-cracking conditions are such that the remaining liquid fraction from the thermal-cracking zone contains detectable amounts of precipitated asphaltenes, and that the remaining liquid fraction from the second vapor-liquid separator is fed to a gasifier or coker.

9. The process of claim 1 wherein the thermally-cracked components with normal boiling points below 537° C. in the vapor fraction of the second vapor-liquid separator have a hydrogen weight content of at least 11.5 weight percent.

10. The process of claim 1 wherein the pyrolytic cracking conditions include a pyrolytic cracking temperature of from about 700° C. to about 900° C., a pyrolytic cracking pressure of from about 15 psia to about 30 psia, and wherein the gaseous fractions are exposed to the pyrolytic cracking conditions within the radiant zone for a pyrolytic cracking time period upwardly to about 10 seconds.

11. The process of claim 1 wherein said vapor-liquid separator is a centrifugal vapor-liquid separator.

12. The process of claim 1 wherein superheated dilution steam is added to the heated gas-liquid mixture from the first stage preheater at a point prior to entry to the first vapor-liquid separator, and wherein the temperature of said dilution steam is at least 10° C. higher than the temperature of the heated gas-liquid mixture.

13. The process of claim 1 wherein said thermal-cracking zone comprises a soaker drum having means to control the temperature and residence time in said drum.

14. The process of claim 1 wherein said feedstock is selected from the group consisting of crude oil, long residue, short residue, heavy gas oil, vacuum gas oil and mixtures thereof.

15. The process of claim 2 wherein said mild thermal-cracking conditions include a temperature of from about 425° C. to about 525° C., and wherein the liquid in said thermal-cracking zone is maintained at the thermal-cracking conditions within the thermal-cracking zone for a time period of from about 10 seconds to about 960 seconds.

16. The process of claim 15 wherein the thermal-cracking zone is operated such that the remaining liquid thermally-cracked fraction from the stripping section is stable with no asphaltene precipitation and has less than 0.1 weight percent sediments as measured by ASTM D-473.

17. The process of claim 16 wherein said thermal-cracking conditions result in the conversion of at least ten (10) weight percent of the 537° C. plus components present in the removed liquid from the vapor-liquid separator to 537° C. minus components, said conversion being based on the feed to the thermal-cracking zone.

18. The process of claim 2 wherein the vapor thermally-cracked fraction from the stripping section has a hydrogen weight content of at least 11.5 weight percent.

19. The process of claim 2 wherein said vapor-liquid separator is a centrifugal vapor-liquid separator.

20. The process of claim 2 wherein said thermal-cracking zone comprises a soaker drum having means to control the temperature and residence time in said drum.

21. The process of claim 2 wherein superheated dilution steam is added to the heated gas-liquid mixture from the preheater at a point prior to entry to the first vapor-liquid separator, and wherein the temperature of said dilution steam is at least 10° C. higher than the temperature of the heated gas-liquid mixture.

22. The process of claim 3 wherein said mild thermal-cracking conditions include a temperature of from about 425° C. to about 525° C., and wherein the liquid in said thermal-cracking zone is maintained at the thermal-cracking conditions within the thermal-cracking zone for a time period of from about 10 seconds to about 960 seconds.

23. The process of claim 22 wherein the thermal-cracking zone is operated such that the remaining liquid fraction from the vapor-liquid separator is stable with no asphaltene precipitation and has less than 0.1 weight percent sediments as measured by ASTM D-473.

24. The process of claim 23 wherein said thermal-cracking conditions result in the conversion of at least ten (10) weight percent of the 537° C. plus components present in the removed liquid from the vapor-liquid separator to 537° C. minus components, said conversion being based on the feed to the thermal-cracking zone.

25. The process of claim 3 wherein the thermally-cracked components with normal boiling points below 537° C. in the vapor fraction of the vapor-liquid separator have a hydrogen weight content of at least 11.5 weight percent.

26. The process of claim 3 wherein said vapor-liquid separator is a centrifugal vapor-liquid separator.

27. The process of claim 3 wherein said thermal-cracking zone comprises a soaker drum having means to control the temperature and residence time in said drum and means to maintain mixing of the heated gas-liquid mixture.

28. The process of claim 3 wherein said feedstock is selected from the group consisting of long residue, short residue, and mixtures thereof.

29. The process of claim 4 wherein said mild thermal-cracking conditions include a temperature of from about 425° C. to about 525° C., and wherein the liquid in said thermal-cracking zone is maintained at the thermal-cracking conditions within the thermal-cracking zone for a time period of from about 10 seconds to about 960 seconds.

30. The process of claim 29 wherein the thermal-cracking zone is operated such that the remaining liquid fraction from the second vapor-liquid separator is stable with no asphaltene precipitation and has less than 0.1 weight percent sediments as measured by ASTM D-473.

31. The process of claim 30 wherein said thermal-cracking conditions result in the conversion of at least ten (10) weight percent of the components with normal boiling points above 537° C. present in the removed liquid from the first vapor-liquid separator to components with normal boiling points below 537° C. components, said conversion being based on the feed to the thermal-cracking zone.

32. The process of claim 4 wherein the thermally-cracked components with normal boiling points below 537° C. in the vapor fraction of the second vapor-liquid separator have a hydrogen weight content of at least 11.5 weight percent.

33. The process of claim 4 wherein said vapor-liquid separator is a centrifugal vapor-liquid separator.

34. The process of claim 4 wherein said thermal-cracking zone comprises a soaker drum having means to control the temperature and residence time in said drum.

35. The process of claim 4 wherein said feedstock is selected from the group consisting of crude oil, long residue, short residue, heavy gas oil, vacuum gas oil and mixtures thereof.

* * * * *